United States Patent [19]

Hashimoto

[11] Patent Number: 4,983,819
[45] Date of Patent: Jan. 8, 1991

[54] OPTICAL CARD

[75] Inventor: Akihiko Hashimoto, Tokyo, Japan

[73] Assignee: Olympus Optical Co., Ltd., Tokyo, Japan

[21] Appl. No.: 121,800

[22] Filed: Nov. 17, 1987

[30] Foreign Application Priority Data

Nov. 21, 1986 [JP] Japan .................................. 61-276816

[51] Int. Cl.$^5$ ............................................. G06R 19/02
[52] U.S. Cl. ..................... 235/488; 235/385; 235/457; 235/487
[58] Field of Search ............... 235/488, 487, 385, 457; 369/59, 44

[56] References Cited

U.S. PATENT DOCUMENTS

| 4,157,784 | 6/1979 | Grottrup | 235/488 |
| 4,254,329 | 3/1981 | Gokey | 235/385 |
| 4,598,196 | 7/1986 | Pierce | 235/457 |
| 4,730,293 | 3/1988 | Pierce | 369/44 |
| 4,782,221 | 11/1988 | Brass | 235/487 |

FOREIGN PATENT DOCUMENTS 61-214152 9/1982 Japan .
82-02968 9/1982 World Int. Prop. O. .

OTHER PUBLICATIONS

Japanese Patent Appln. Laid-Open No. 61-214,152.

Primary Examiner—Harold Pitts
Attorney, Agent, or Firm—Parkhurst, Wendel & Rossi

[57] ABSTRACT

In an optical card having a card substrate on which binary data are recorded by a portion having high reflectivity and a portion having low reflectivity, a background portion is formed by a material having low reflectivity. Therefore, even if a positional relation between a light receiving region of a light receiving element and a bit portion is varied, the data can be accurately read out. Further, since the background portion can be formed by the printing method or the photo developing method and can be used for the other of binary data, the optical card can be manufactured in an inexpensive manner without generating a skew.

5 Claims, 3 Drawing Sheets

OPTICAL CARD

BACKGROUND OF THE INVENTION

1. Field of the Invention

The present invention relates to an optical card.

2. Related Art Statement

Up to this time, an optical card disclosed in PCT/US82/00187 has been known. In this optical card, a metal record layer having high reflectivity is stuck to a substrate made of plastics etc., and data are recorded on the metal record layer as a black pit, i.e. a portion having low reflectivity by projecting a writing laser beam modulated by the data to be recorded thereon. When the recorded data are to be read out, a reading laser beam is projected on the metal record layer, and the data are read out by detecting a variation in reflectivity.

However, in the optical card mentioned above, since it is necessary to stick the metal record layer on the substrate, a skew might occur and thus flatness of the card surface cannot be maintained. Moreover, since the data for read only memory (ROM) is recorded by the laser beam, the cost for recording might be increased corresponding to the increase of the data to be recorded, and a recording error might occur due to an adhesion of dust etc. on the substrate. Further, in the known optical card, the data are recorded as the pit, constructed as a portion having low reflectivity by projecting the writing laser beam on the metal record layer having high reflectivity. Therefore, if a positional relation between a pit 1 and a receiving region 2 of a light receiving element on which light reflected by the pit 1 is projected is varied a little as shown in FIG. 7, the amount of reflected light is increased and thus the pit 1 cannot be normally detected. Therefore, the recorded data cannot be accurately read out.

SUMMARY OF THE INVENTION

The object of the present invention is to eliminate the drawbacks mentioned above and to provide an optical card which realizes easily a good flatness of the substrate surface, an inexpensive cost and an accurate data reading.

According to the invention, an optical card having a card substrate on which binary data are recorded by a portion having high reflectivity and a portion having low reflectivity, comprises a background portion consisting of a material having low reflectivity.

In the preferred embodiment, on said card substrate are arranged a read only memory portion comprising a first material layer having low reflectivity and used for one of binary data and said background portion, and a second material layer having high reflectivity and used for an other of binary data, and/or a data read and write portion comprising a third material layer having a low reflectivity and used for said background portion and a fourth material layer normally having high reflectivity representing the other of binary data and changed into a portion having low reflectivity representing one of binary data when a writing light is projected thereon.

In the construction mentioned above, the background portion can be formed by adding a black-like color on the substrate of the optical card by means of photo developing etc., and a material having high reflectivity can be formed so as to cover the background portion. As for the material having high reflectivity, use is made of a metal such as Al which is not deteriorated in color by the light projection and is coated on the background portion by means of, for example, a sputtering method. In this case, a portion coated with the material having high reflectivity can be used for the other of binary data and the background portion can be used for one of binary data. In this manner, the read only memory portion (ROM portion) can be constructed.

Moreover, as for the material having high reflectivity, use is made of a gelatin including a silver-like coloring agent whose reflectivity is made substantially equal to that of the background portion by the projection of the writing light. In this case, a portion having the reflectivity substantially equal to that of the background portion on which the writing light is projected can be used for one of binary data, and a portion having high reflectivity on which no writing light is projected can be used for the other of binary data. In this manner, the data read and write portion (DRAW portion) can be constructed.

DESCRIPTION OF THE PREFERRED EMBODIMENTS

Figure 1:
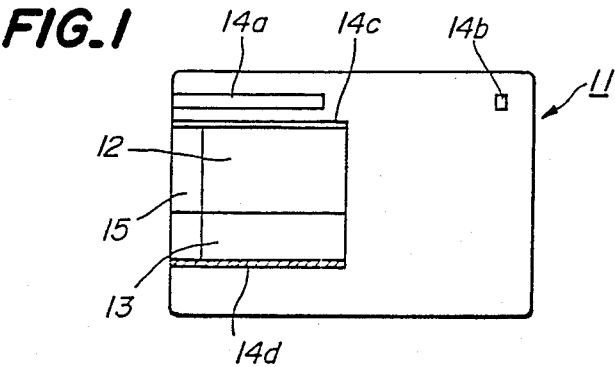
FIG. 1 is a schematic view showing one embodiment of the optical card according to the invention.

FIG. 1 is a schematic view showing one embodiment of the optical card according to the invention. In an optical card 11, a read only memory portion (ROM portion) 12 and a data read and write portion (DRAW portion) 13 are arranged on one surface of the optical card 11 and successively in a card width direction. Both the ROM portion 12 and the DRAW portion 13 have a plurality of tracks each consisting of a number of lines which extend in a card longitudinal direction. In the ROM portion 12, all the regions are constructed as the read only memory portion. Contrary to this, the DRAW portion 13 comprises the read only memory portion such as a clock portion, a track number portion etc. and the data read and write portion on which the data are actually recorded.

On the surface of the optical card 11 are further arranged card detection marks 14a, 14b, each having high reflectivity, which are detected by a photoreflector of a read/write apparatus, and a head start detection mark 14c having high reflectivity and a track end detection mark 14d having low reflectivity which are detected by a read/write head of the read/write apparatus. The card detection marks 14a, 14b are used for controlling the travelling of the optical card 11 in the read/write apparatus, and the head start detection mark 14c and the track end detection mark 14d are used for controlling the movement of the read/write head in the read/write apparatus.

That is to say, the card detection mark 14a functions to detect a front edge portion of the optical card 11 in the course of travelling in the read/write apparatus so as to load automatically the optical card 11 by driving a card travelling motor, and to detect a rear edge portion of the optical card 11 so as to stop the travelling of the optical card 11. In this case, the read/write head is located on a seek portion 15 including the track number portion etc. of the ROM portion 12 or the DRAW portion 13. When the read/write head detects the head start detection mark 14c formed in contact with the first track of the ROM portion 12, the head scans the seek portion 15 in a direction perpendicular to the track direction so as to detect a desired track. Moreover, when the read/write head detects the track end detection mark 14d formed in contact with the last track of the DRAW portion 13, the movement of the optical card 11 in the track direction is stopped. Further, the card detection mark 14b functions to detect the end of scanning operation for one track of the read/write head.

Figure 2:
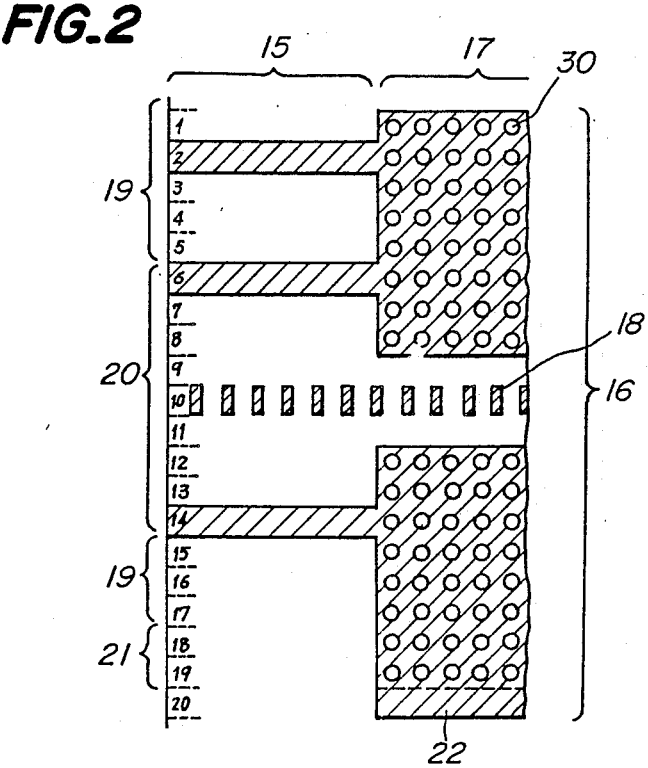
FIG. 2 is a schematic view illustrating a format of one track of the optical card shown in FIG. 1.

FIG. 2 is a schematic view showing a format of one track in the ROM portion 12 and the DRAW portion 13. In this embodiment, one track 16 comprises the seek portion 15 positioned at its top portion and a data portion 17 arranged successively to the seek portion 15. Moreover, one track 16 has twenty lines each having substantially equal width. Further, a clock portion 18 for use in clock generation, focusing error detection and tracking error detection is formed at the tenth line counted from the upper edge and along the seek portion 15 and the data portion 17. In this embodiment, the clock portion 18 is constructed as a plurality of black patterns with the same interval. Moreover, in the seek portion 15, a track number portion 19 consisting of patterns for indicating the track number is set to the first to fifth lines and the 15th to 17th lines, and a pattern recognition portion 20 consisting of patterns for recognizing the track number is set to the sixth to 14th lines. Further, a record confirm portion 21 for use in the DRAW portion 13 is set to the 18th and 19th lines. In the record confirm portion 21, when the data are not recorded on the track both lines are white, when the data are still recorded on the track the 18th line is made black, and when the data recording is ended the 19th line is also made black. Moreover, a frame synchronizing line 22 made of black color for detecting a frame frequency signal is set to the 20th line. In this manner, in the data portion 17, the first to eighth lines arranged on the upper part with respect to the clock portion 18 and the 12th to 19th lines arranged on the lower part with respect to the clock portion 18 construct a byte consisting of eight bits, respectively.

Next, constructions of the ROM portion 12 and the DRAW portion 13 will be explained.

Figure 3A:
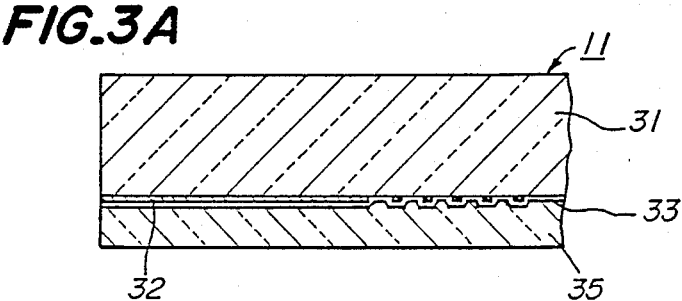
FIGS. 3A and 3B are cross sectional views depicting a read only memory portion (ROM portion) and a data read and write portion (DRAW portion) of the optical card shown in FIG. 1, respectively.
Figure 3B:
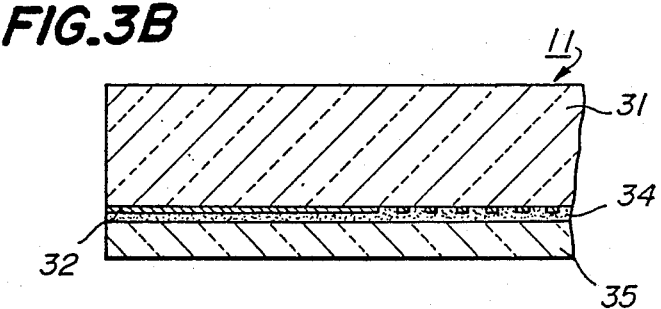

In the ROM portion 12, all the regions are constructed as read only memory portions. In the DRAW portion 13, the record confirm portion 21 in the seek portion 15 and bit portions forming respective bytes in the data portion 17 (white circle 30 in FIG. 2) are constructed as the data read and write portion, and the other portions are constructed as the read only memory portion. Referring to FIG. 3A showing the cross section of the read only memory portion and FIG. 3B illustrating the cross section of the data read and write portion, a black background portion 32 is formed on one surface of a card substrate 31 made of transparent plastics etc. by backing it by means of photoplate making etc. In the ROM portion 12, the background portion 32 is used for respective black patterns each indicating one (black) of binary data in the seek portion 15, the background of the first to eighth lines and the 12th to 19th lines in the data portion 17, the frame synchronizing line 22 indicating one of binary data in the 20th line and one of binary data in the bit portion 30. Moreover, in the DRAW portion 13, the background portion 32 is used for respective black patterns each indicating one (black) of binary data except for the record confirm portion 21 in the seek portion 15 and the background of the first to eighth lines and the 12th to 19th lines except for the bit portions 30 in the data portion 17.

Then, in the read only memory portion, metal reflection film 33 made of Al etc., which is not deteriorated in color by the light projection is coated on the background portion 32 by means of the sputtering method, etc. In the data read and write portion, a record medium 34 made of gelatin layer, including a silver-like coloring agent whose reflectivity is changed to substantially equal to that of the background portion by the projection of the writing light, is coated on the background portion 32 by a painting or an adherent method. Then, a rear surface protection layer 35 made of plastics etc. is arranged on the metal reflection film 33 or the record medium 34. In this case, the metal reflection film 33 indicates the other (white) of binary data, and the record medium 34 indicates the other of binary data when no writing light is projected or one (black) of binary data when the writing light is projected. Further, the card detection marks 14a, 14b and the head start detection mark 14c are constructed of the metal reflection film 33, and the track end detection mark 14d is constructed of the background portion 32.

A data reading operation of the optical card 11 is performed as follows. At first, the track 16 is projected by a spot light and a light reflected on the clock portion 18 is detected to effect the focusing control or the tracking control of the reading head. Then, the data are read out by receiving a light reflected on respective bit portions 30 aligned in the card width direction by means of a corresponding light receiving element. Moreover, a data recording operation in the DRAW portion 13 is performed by scanning a writing light modulated by the data in the track width direction on respective tracks 16.

Figure 4:
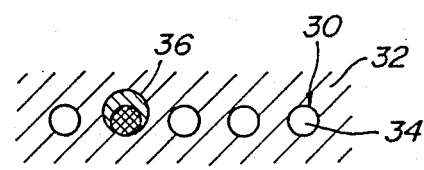
FIGS. 4 and 5 are schematic views for explaining a data writing operation and a data reading operation with respect to the optical card shown in FIG. 1, respectively.

In the embodiments mentioned above, since the data in the read only memory portion of the ROM portion 12 and the DRAW portion 13 comprises the background portion 32 formed by the printing method or the photo developing method and the metal reflection film 33 coated on the background portion 32, the data recording operation can be made inexpensive in cost as compared with the case that use is made of the writing light even if the amount of data to be dealt with is large. Moreover, since the background portion 32, the metal reflection film 33 and the record medium 34 can be made extremely thin, the generation of the skew can be decreased, and thus the flatness of the card can be easily realized. Further, in the data portion 17 of the DRAW portion 13, since the white bit portions 30 made of the record medium 34 are formed on the black background portion 32 as shown in FIG. 4 and an area of respective bit portions can be made relatively small, the data can be accurately recorded even if a writing light 36 is shifted a little with respect to the bit portion 30.

Figure 5:
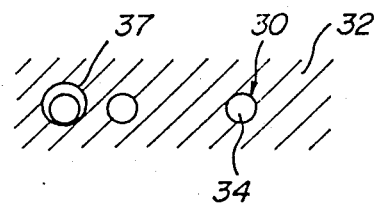

Moreover, since the black bit is constructed by the background portion 32 in the ROM portion 12 and is constructed by the record medium 34 having low reflectivity substantially equal to that of the background portion 32 in the DRAW portion 13, the data consisting of the black bit portions can be accurately detected. Furthermore, as shown in FIG. 5, the white bit portion 30 has also the black background portion 32. Therefore, since an amount of light reflected on the white bit portion 30 is large even if a positional relation between a light receiving region 37 of the light receiving element and the bit portion 30 is varied, the data can be accurately read out. Moreover, since, in the DRAW portion 13, the white bit portions except for the data read and write portion is constructed of the metal reflection film 33 as is the same as the ROM portion 12, the data read and write portion in the DRAW portion 13 is not broken at all even if the writing light is projected thereon by mistake, as well as the ROM portion 12. Further, since the DRAW portion 13 is constructed by the steps substantially equal to those of the ROM portion 12 except for the arrangement of the record medium 34, the DRAW portion 13 can be manufactured in an inexpensive manner.

Figure 6:
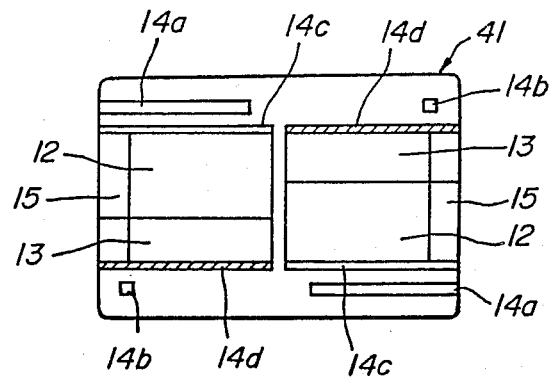
FIG. 6 is a schematic view showing another embodiment of the optical card according to the invention.
Figure 7:
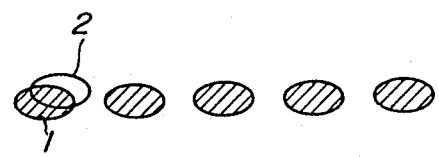
FIG. 7 is a schematic view for explaining a drawback of the known optical card.

FIG. 6 is a schematic view showing another embodiment of the optical card according to the invention. In FIG. 6, portions similar to those in FIG. 1 denote the same reference numerals as those in FIG. 1. In this embodiment, both sides of one surface of an optical card 41 are used for the data. That is to say, the ROM portion 12, the DRAW portion 13, the card detection marks 14a, 14b, the head start detection mark 14c and the track end detection mark 14d are arranged symmetrically on one surface of the optical card 41.

The present invention is not limited to the embodiments mentioned above, but various modifications are possible. For example, in the embodiments mentioned above, the optical card has the ROM portion 12 and the DRAW portion 13, but only ROM portion or DRAW portion can be formed on the optical card. Moreover, the ROM portion and/or the DRAW portion can be arranged on both surfaces of the optical card.

According to the invention, since the background portion is constructed by the material having low reflectivity and one of binary data is constructed by the material having high reflectivity, the data reading operation can be always performed in an accurate manner. Moreover, since the background portion can be formed by the printing method or the photo developing method and can be used for the other of binary data, the optical card can be manufactured in an inexpensive manner. Further, since the background portion and the material coated thereon can be made extremely thin, the skew can be minimized and the flatness of the optical card can be realized in an easy manner.

What is claimed is:

1. An optical card comprising:
   a transparent substrate;
   a read only memory portion comprising a first material layer formed on said substrate and having low reflectivity, and a second material layer formed on said first material layer and having high reflectivity, a plurality of through holes being formed in said first material layer to represent pre-recorded binary data; and
   a data read and write portion comprising a third material layer formed on said substrate and having low reflectivity, a plurality of through holes, which represent pits of all possible binary data to be recorded, being formed in said third material layer with a regular pitch, and a fourth material layer formed on said third material layer, said fourth material layer having a reflectivity which varies from high to low when a light beam for writing binary data is made incident thereupon through at least one of said through holes formed in said third material layer.

2. An optical card according to claim 1, further comprising a protecting layer formed on said at least one portion, thereby sandwiching said at least one portion between said substrate and said protecting layer.

3. An optical card according to claim 1, wherein said first material layer is formed without bit portions which have high reflectivity and represent said binary data.

4. An optical card according to claim 1, wherein said third layer is formed without any bit portions representing said binary data.

5. An optical card according to claim 1, wherein a first pair of said read only memory portion and said data read and write portion is arranged on one end of said card substrate, and a second pair is symmetrically arranged on the other end of said card substrate.

* * * * *